US007781052B2

(12) United States Patent
Matsufuji et al.

(10) Patent No.: US 7,781,052 B2

(45) Date of Patent: Aug. 24, 2010

(54) METHOD FOR MAKING PARTICLE BOARD

(75) Inventors: Go Matsufuji, Chiyoda-ku (JP); Kenji Ogura, Chiyoda-ku (JP); Toshio Yasuda, Chiyoda-ku (JP)

(73) Assignee: Sumitomo Forestry Co., Ltd., Chiyoda-Ku, Tokyo (JP)

( * ) Notice: Subject to any disclaimer, the term of this patent is extended or adjusted under 35 U.S.C. 154(b) by 973 days.

(21) Appl. No.: 10/543,299

(22) PCT Filed: May 30, 2005

(86) PCT No.: PCT/JP2005/009888

§ 371 (c)(1),
(2), (4) Date: Jul. 26, 2005

(87) PCT Pub. No.: WO2005/115705

PCT Pub. Date: Dec. 8, 2005

(65) Prior Publication Data

US 2006/0284332 A1 Dec. 21, 2006

(30) Foreign Application Priority Data

May 31, 2004 (JP) ............................ 2004-160870

(51) Int. Cl.
*B32B 21/04* (2006.01)

(52) U.S. Cl. .................. 428/292.4; 156/62.2; 264/112; 264/113; 264/122

(58) Field of Classification Search ................. 264/112, 264/113, 122; 428/292.4, 297.4; 156/62.2
See application file for complete search history.

(56) References Cited

U.S. PATENT DOCUMENTS

| | | | | |
|---|---|---|---|---|
| 3,287,855 | A * | 11/1966 | Hallonquist et al. | 49/503 |
| 3,892,619 | A * | 7/1975 | Hutz | 156/382 |
| 3,905,847 | A * | 9/1975 | Black | 156/62.2 |
| 4,246,310 | A * | 1/1981 | Hunt et al. | 428/106 |
| 4,405,542 | A * | 9/1983 | Greer | 264/109 |
| 6,011,205 | A * | 1/2000 | Tucker et al. | 84/291 |
| 2002/0192400 | A1* | 12/2002 | Schneider | 428/15 |

FOREIGN PATENT DOCUMENTS

| | | | | |
|---|---|---|---|---|
| CN | 1490227 | A | | 4/2004 |
| JP | 04-140389 | | | 5/1992 |
| JP | 06031708 | A | * | 2/1994 |
| JP | 06-254815 | | | 9/1994 |
| JP | 06297417 | A | * | 10/1994 |
| JP | 07-112411 | | | 5/1995 |
| JP | 07-171808 | | | 7/1995 |
| JP | 2001170912 | A | * | 6/2001 |
| JP | 2001-293706 | | | 10/2001 |
| JP | 2006231885 | A | * | 9/2006 |
| WO | WO 03035341 | A1 | * | 5/2003 |

OTHER PUBLICATIONS

Subyakto, Takeshi Kajimoto, Tashimitsu Hata, Shigehisa Ishihara, Shuichi Kawai, and Hideo Getto: Improving Fire Retardancy of Fast Growing Wood by Coating with Fire Retardant and Surface Densification, 1998, Fire and Materials, vol. 22, pp. 207-212.*

Zwerneman et al, Glue-Laminated Timber Panels for Bridge Deck Replacement, In: Ritter, M.A.; Duwadi, S.R.; Lee, P.D.H., ed(s). National conference on wood transportation structures; Oct. 23-25, 1996: U.S. Department of Agriculture, Forest Service, Forest Products Laboratory.*

JPO English machine translation of JP 2001-293706.*

Englsih Abstract of JP 2006-231885, 2006.*

Imamura et al, Dimensional Stability and Biological Resistance of Particleboard from Acetylated Albizzia Wood Particles, 1989, Japan J. Wood Research, No. 76, pp. 49-58.* http://www.winrock.org/fnrm/factnet/factpub/FACTSH/P_falcataria_bckup.html, 1989.*

Jilin Forestry Science and Technology, Feb. 1996, No. 1(Total No. 120) pp. 28-32.

Search Report.

Abstracts of the 49th Annual Meeting of the Japan Wood Research Society 1999, p. 264.

Kawai, S. et al. Journal of the Japan Wood Research Society vol. 33, No. 5, p. 385-292, 1987.

* cited by examiner

*Primary Examiner*—Joseph S Del Sole
*Assistant Examiner*—Timothy Kennedy
(74) *Attorney, Agent, or Firm*—Connolly Bove Lodge & Hutz LLP

(57) ABSTRACT

In making a particle board by forming a mat from particles obtained from a wooden material and pressing the mat, a particle board light in weight and excellent in strength, dimensional stability and surface properties can be made at a low cost by using a wooden material of low specific gravity and carrying out the press of the particle board with a high compression ratio in mat thickness before and after the press.

11 Claims, No Drawings

METHOD FOR MAKING PARTICLE BOARD

TECHNICAL FIELD

The present invention relates to a method for making a particle board which comprises forming a mat from particles obtained from a wooden material of low specific gravity and subjecting the mat to press, and a particle board made by the method. More particularly, the present invention relates to a method for making a particle board which comprises forming a mat from particles obtained from a wooden material and subjecting the mat to press, with using particles obtained from a wooden material of low specific gravity and with a high compression ratio in mat thickness before and after the press, whereby a particle board light in weight and excellent in strength (strength defined by bending strength, internal bond, wood screw holding power, bonding Young's modulus or the like), dimensional stability and surface qualities can be made at a low cost. Furthermore, the present invention relates to a particle board which is made by the above method and which is light in weight and excellent in strength, dimensional stability and surface qualities in spite of the light weight.

BACKGROUND ART

Recently, wooden boards such as particle boards have been noticed as substitutes for plywood mainly composed of logs, and at present they are used in a wide variety of the fields as structural members such as floorings and wall materials, interior molding members such as door members, furniture materials, etc.

Usually, particle boards are obtained by forming a mat from a mixture of an adhesive and particles obtained by grinding wooden materials (including constructional wooden wastes, reclaimed materials, etc.) having an air dried specific gravity (specific gravity in the state of being stabilized with a moisture content of about 5-13% by subjecting to moisture conditioning at general temperature and humidity) of about 0.4-0.7 and then press the mat.

As a method for making particle boards, for example, Patent Document 1 discloses press, by usual method, particles having a specific gravity of 0.2 or less, such as balsa. Non-Patent Document 1 discloses a method of making particle boards by pressing particles of low specific gravity which are obtained from poplar of China growth and adjusted in moisture content. Furthermore, Non-Patent Document 2 discloses making particle boards by pressing a mat of low specific gravity obtained from balsa, apitong, etc. at various compression ratios (specific gravity of board/specific gravity of raw material).

Patent Document 1: JP-A-2001-293706

Non-Patent Document 1: Abstracts of the 49th Annual Meeting of the Japan Wood Research Society 1999, page 264

Non-Patent Document 2: Journal of the Japan Wood Research Society Vol. 33, No. 5, p. 385-392, 1987

DISCLOSURE OF INVENTION

Problem to be Solved by the Invention

The specific gravity of particle boards, namely, board density, made at present, is mainly 0.65-0.75, but particle boards of light weight are preferred from the points of operability such as fabrication and handling at the time of laying. However, if particle boards of light weight are made by conventional methods, the compression ratio in mat thickness before and after press is small and high strength can hardly be obtained.

Furthermore, in the case of making a particle board of three-layer structure, to the surface of which is applied a decorative paper or sheet, usually the particles for the face layers are disposed by force of air so that finer particles are disposed on the surface. In this method, the relation "light=fine" is important, and if a wooden material of conspicuously low specific gravity is incorporated, particles of relatively large diameter are disposed on the surface because even the particles of relatively large diameter, they are light in weight, and thus the surface qualities such as smoothness and roughness are deteriorated. Therefore, in general, it is preferred to use a wooden material of about 0.4-0.7 in specific gravity as a raw material for making a particle board and exclude a wooden material having an extremely low specific gravity.

The present invention has been made in view of the above circumstances, and the object is to provide a particle board light in weight and excellent in strength, dimensional stability and surface qualities at a low cost.

Means for Solving the Problem

As a result of intensive research conducted by the inventors in an attempt to solve the above problems, it has been found that a particle board light in weight and excellent in strength, dimensional stability and surface qualities can be made at a low cost by using particles obtained from a wooden material of low specific gravity and increasing the compression ratio in mat thickness before and after the press. Thus, the present invention has been accomplished.

Accordingly, the present invention relates to a method for making a particle board which comprises forming a mat from particles obtained from a wooden material and pressing the mat to make a particle board, characterized by using a wooden material of low specific gravity and carrying out the press with a high compression ratio in mat thickness before and after the press.

The present invention further relates to a particle board made by the above method.

ADVANTAGES OF THE INVENTION

According to the present invention, a particle board light in weight and excellent in strength, dimensional stability and surface qualities can be made at a low cost by using particles obtained from a wooden material of low specific gravity and carrying out the press at a high compression ratio in mat thickness before and after the press.

BEST MODE FOR CARRYING OUT THE INVENTION

The method for making the particle board of the present invention will be explained in detail below.

The present invention relates to a method for making a particle board by forming a mat from particles which are obtained by crushing a wooden material and pressing the resulting mat.

In the present invention, wooden materials of low specific gravity are used. Preferably, the wooden materials used have a specific gravity in the range of preferably more than 0.2 and less than 0.4, more preferably 0.23-0.36, and examples of trees include those of low specific gravity, such as *Paraserianthes falcataria* Becker (another name: *Albizia falcataria*), *Populus* spp., and the like. In the present invention, the compression ratio in mat thickness before and after the press can be increased by using particles obtained from a wooden material having a specific gravity of more than 0.2 and less than 0.4, and the strength of the resulting particle boards increases with increase of internal bond and surface density of the boards, and the dimensional stability is also improved. As a result, the particle boards can be made at a low cost due to decrease in raw material cost.

The particle diameter of the particles obtained from wooden materials of low specific gravity is not particularly limited, and is usually 0.1-15 mm, more preferably 0.25-9 mm. Crushing of the wooden material to make particles is generally carried out using chippers, flakers, refiners, etc., and the method for obtaining the particles is not particularly limited.

Then, the particles are dried to give a moisture content of about 2-10%, the dried particles are mixed with an adhesive, and a mat is formed from the mixture. The mat can be formed, for example, by a method of making a single-layer structure, a method of distributing the particles of fine diameter in the portion corresponding to the surface of board and distributing the particles of large diameter in the core layer to make a three-layer structure, and the like. In the present invention, there may be used any methods.

In making a particle board of three-layer structure, generally, a method is employed which uses particles of fine diameter for face layer so as to distribute finer particles on the board surface and distributes the particles with air force to form a mat for the face layer, and this method is preferred in the present invention. According to the present invention, a light weight particle board excellent in surface qualities can be made by using only a wooden material having a specific gravity of more than 0.2 and less than 0.4, such as *Albizia falcataria* and *Populus* spp., without mixing with other wooden materials having a specific gravity outside the above range.

As the adhesives used in admixture with the particles, there may be used any adhesives so long as there are no problems in mixing with particles and compressive bonding, and, for example, there may be used formaldehyde adhesives, isocyanate compound adhesives, and the like. The formaldehyde adhesives include, for example, urea formaldehyde resin adhesives such as urea formaldehyde resin adhesives and melamine urea formaldehyde resin adhesives; melamine formaldehyde resin adhesives; or phenol formaldehyde resin adhesives, etc. The isocyanate compound adhesives include, for example, diphenylmethane diisocyanate (MDI) adhesives. Of these adhesives, generally, urea formaldehyde resin adhesives are preferred in the case of particle boards used for the usage such as interior molding where they are not exposed to water, and melamine urea formaldehyde resin adhesives, melamine formaldehyde resin adhesives, phenol formaldehyde resin adhesives and isocyanate compound adhesives are preferred in the case of particle boards used for the usages such as lavatory, kitchen and structural members where they are exposed to water. Thus, the adhesives can be used depending on the usage. If the particle boards are to be made at a low cost without requiring much labor for handling, formaldehyde adhesives are preferred. For making the boards at further lower cost, urea formaldehyde resin adhesives are preferred.

The amount of the adhesives is usually about 4-10% based on the total dry weight of the particles in the case of the single-layer structure. In the case of the three-layer structure, the amount of the adhesives is usually about 6-12% for face layer and usually about 4-10% for core layer based on the total dry weight of the particles.

The mat formed as mentioned above is pressed, usually, with heating (150-250° C.) by a continuous press or batch type flat press to form a particle board. In the present invention, it is preferred to carry out the press so that the compression ratio in mat thickness before and after the press, namely, a reduction ratio of thickness of the mat after press to thickness of the mat before press, is preferably not less than 80% and not more than 90%, more preferably 85-90%. Here, the thickness of mat before press means specifically a thickness of mat formed by mixing the particles and the adhesive by a usual method and spreading the mixture by spontaneously dropping it without applying external force such as pressurization or suction. Therefore, for example, when a mat before press is formed by applying an external force such as pressurization or suction to the mixture of the particles and the adhesive, it is necessary to take into consideration the reduction of thickness of mat before press caused by application of the external force such as pressurization or suction. In this case, the same effect as of the present invention is obtained even if the compression ratio is less than 80%. Furthermore, in many cases, the thickness is controlled simultaneously with improving the surface properties by sanding the board after press with a sander or the like, and the thickness of mat after press in this case means the thickness before sanding by a sander or the like after press. In the present invention, the press is carried out in such a manner that a reduction ratio of the thickness of mat after press to the thickness of mat before press in the sense as mentioned above, namely, a compression ratio in thickness of mat, is not less than 80% and not more than 90%, and, thus, the internal bond and surface density of the particle board can be easily enhanced and a particle board excellent in strength, dimensional stability and surface qualities can be easily obtained. With increase of the compression ratio, the strength also increases, but raw material cost simultaneously increases and the press takes much time to cause deterioration of productivity, and thus the compression ratio is suitably not more than 90%.

Moreover, in the present invention, the board density of the resulting particle boards can be decreased as compared with that of the boards obtained by conventional methods, and can be made to preferably 0.55 or less. As a result, the dimensional stability can be improved and the raw material cost can be lowered, and the boards can be made at a low cost.

The strength of the particle board made as mentioned above can further be improved by laminating a wooden thin plate such as a veneer or MDF on the surface of the board. Any thin plates can be used as far as they are wooden, but they must have a strength in some degree and, besides, they desirably have a density of not less than 0.1 and not more than 1.0 and a thickness of not less than 5% and not more than 50% of the final particle board so as to control the overall density of the board. For laminating the thin plate, any adhesives may be used so long as they cause no problem in lamination on the particle board, and adhesives for wood, such as urea formaldehyde resin adhesives, melamine urea formaldehyde resin adhesives, melamine formaldehyde resin adhesives, phenol formaldehyde resin adhesives and isocyanate compound adhesives, can be selected depending on the usages.

The particle boards obtained by the method explained above have a board density of 0.2-0.55 and a specific bending strength (obtained by dividing bending strength by board density) of not less than 15 and not more than 36, and thus are light in weight and very excellent in strength.

The advantages of the present invention will be explained by the following examples and comparative examples, which should not be construed as limiting the invention in any manner.

Example 1

Particles obtained from *Albizia falcataria* of 0.23 in raw material specific gravity using a knife ring flaker were dried, and then, the resulting particles were screened by sieves of 2 mm to 9 mm in mesh size. Using the particles, single-layer particle boards having a thickness of 16 mm and a board density of 0.20, 0.4 and 0.55 were made. More specifically, the particles were mixed with an adhesive using a drum type blender, and a mat was formed by spontaneously dropping and spreading the mixture without applying external force such as pressurization or suction. The resulting mat was subjected to press to make a particle board, which was not subjected to sand by a sander or the like. A urea formaldehyde resin adhesive was used as the adhesive in an amount of 8% based on the total dry weight of the particles.

Comparative Example 1

Using *Pinus merkusii* of 0.54 in specific gravity as a raw material, single-layer particle boards having a thickness of 16 mm and a board density of 0.20, 0.4, 0.55 and 0.6 were made in the same manner as in Example 1. These particle boards were not subjected to sand by a sander or the like.

Tests for evaluation of physical properties were conducted on the particle boards obtained in Example 1 and Comparative Example 1, and the results are shown in Table 1. Bending strength was used as an indication of strength performance and swelling in thickness after immersion in water was used as an indication of dimension stability.

the particle boards of Comparative Example 1. When the particle boards having similar bending strength were compared, the swelling in thickness after immersion in water was lower in Example 1, which shows that the particle boards of Example 1 were superior in dimensional stability.

Example 2

Particles obtained from *Albizia falcataria* of 0.23 in raw material specific gravity using a knife ring flaker were dried, and then, the particles screened by sieves of 2 mm to 9 mm in mesh size were used for core layer, and the particles screened by sieves of 0.25 mm to 2 mm in mesh size were used for face layers. Using these particles, three-layer particle boards having a thickness of 16 mm and a board density of 0.20, 0.4 and 0.55 were made, and the resulting boards were sanded by a sander to give a thickness of 15 mm.

More specifically, the particles were mixed with an adhesive using a drum type blender, and the mixture was spontaneously dropped and spread without applying external force such as pressurization or suction in such a manner that the particles were distributed in order of face layer, core layer and face layer, thereby forming a mat consisting of 3 layers, which was pressed to make a particle board. A urea formaldehyde resin adhesive was used as the adhesive in an amount of 8% in the core layer and 11% in the face layer based on the total dry weight of the particles.

Comparative Example 2

Using *Pinus merkusii* of 0.54 in specific gravity as a raw material, three-layer particle boards having a thickness of 16 mm and a board density of 0.4, 0.55 and 0.6 were made in the same manner as in Example 2. These particle boards were sanded by a sander to give a thickness of 15 mm.

TABLE 1

| | | Example 1 Raw material specific gravity 0.23 | | | | Comparative Example 1 Raw material specific gravity 0.54 | | | |
|---|---|---|---|---|---|---|---|---|---|
| | | Mat thickness compression ratio (%) | Bending strength ($N/mm^2$) | Specific bending strength* | Swelling in thickness after immersion in water (%) | Mat thickness compression ratio (%) | Bending strength ($N/mm^2$) | Specific bending strength* | Swelling in thickness after immersion in water (%) |
| Board density | 0.20 | 80.7 | 3.1 | 15.5 | 10.3 | 70.5 | 1.3 | 6.5 | 8.8 |
| | 0.4 | 86.7 | 9.8 | 24.5 | 13.2 | 77.1 | 3.7 | 9.3 | 14.3 |
| | 0.55 | 88.6 | 19.3 | 35.1 | 18.8 | 79.7 | 7.5 | 13.6 | 17.8 |
| | 0.6 | — | — | — | — | 85.5 | 14.2 | 23.7 | 26.5 |

*Specific bending strength is obtained by dividing bending strength by board specific gravity.

The number of test specimen: 3 boards × 2 specimens/one board, namely, 6 specimens in total for each board density.

As can be seen from the results in Table 1, the particle boards of Example 1 were superior in bending strength to the particle boards of Comparative Example 1 for all the board densities. Furthermore, the particle boards of Example 1 which were lower in density by one rank than those of Comparative Example 1 had a bending strength similar to that of Tests for evaluation of physical properties were conducted on the particle boards obtained in Example 2 and Comparative Example 2, and the results are shown in Table 2. Bending strength was used as an indication of strength performance and swelling in thickness after immersion in water was used as an indication of dimension stability.

TABLE 2

| | | Example 2 Raw material specific gravity 0.23 | | | | Comparative Example 2 Raw material specific gravity 0.54 | | | |
|---|---|---|---|---|---|---|---|---|---|
| | | Mat thickness compression ratio (%) | Bending strength (N/mm$^2$) | Specific bending strength* | Swelling in thickness after immersion in water (%) | Mat thickness compression ratio (%) | Bending strength (N/mm$^2$) | Specific bending strength* | Swelling in thickness after immersion in water (%) |
| Board density | 0.20 | 80.0 | 3.0 | 15.0 | 8.4 | — | — | — | — |
| | 0.4 | 85.5 | 9.0 | 22.5 | 12.0 | 75.8 | 2.2 | 5.5 | 11.5 |
| | 0.55 | 89.3 | 19.7 | 35.8 | 16.5 | 78.3 | 5.0 | 9.1 | 14.3 |
| | 0.6 | — | — | — | — | 83.4 | 9.7 | 16.2 | 21.1 |

*Specific bending strength is obtained by dividing bending strength by board specific gravity.
The number of test specimen: 3 boards × 2 specimens/one board, namely, 6 specimens in total for each board density.

As can be seen from the results shown in Table 2, the particle boards of Example 2 were superior in bending strength to the particle boards of Comparative Example 2. Furthermore, the particle boards of Example 2 which were lower in density by two ranks than those of Comparative Example 2 had a bending strength similar to that of the particle boards of Comparative Example 2. When the particle boards having similar bending strength were compared, the swelling in thickness after immersion in water was lower in Example 2, which shows that the particle boards of Example 2 were superior in dimensional stability.

Example 3

Using *Albizia falcataria* of 0.23 in raw material specific gravity, a single-layer particle board of 0.20 in board density and 12 mm in thickness was made in the same manner as in Example 1. An *Albizia falcataria* veneer of 0.34 in specific gravity and 2.6 mm in thickness was laminated on both sides of the single-layer particle board obtained above in such a manner that the fiber directions of these veneers were in parallel with each other. The particle board was used without subjecting to sand by a sander or the like. A water based polymer isocyanate adhesive was used for lamination of the veneers on the particle board.

Reference Example 1

The single-layer particle board of 0.20 in board density and 16 mm in thickness made using *Albizia falcataria* in Example 1 was referred to as a particle board of Reference Example 1.

Reference Example 2

The single-layer particle board of 0.6 in board density and 16 mm in thickness made using *Pinus merkusii* in Comparative Example 1 was referred to as a particle board of Reference Example 2.

Tests for evaluation of physical properties were conducted on the particle boards obtained in Example 3 and Reference Examples 1 and 2, and the results are shown in Table 3.

TABLE 3

| Example 3 Board density 0.24 | | Reference Example 1 Board density 0.20 | | Reference Example 2 Board density 0.6 | |
|---|---|---|---|---|---|
| Bending strength *(N/mm$^2$) | Swelling in thickness after immersion in water (%) | Bending strength (N/mm$^2$) | Swelling in thickness after immersion in water (%) | Bending strength (N/mm$^2$) | Swelling in thickness after immersion in water (%) |
| 19.7 | 6.8 | 3.1 | 10.3 | 14.2 | 26.5 |

*The tests were conducted in such a manner that the fiber direction of the veneer was in parallel with span in the bending test.
The number of test specimen: 3 boards × 2 specimens/one board, namely, 6 specimens in total for each board density.

As can be seen from the results shown in Table 3, the particle board of Example 3 was markedly superior in bending strength and dimensional stability to the particle boards of Reference Examples 1 and 2.

Example 4

Using *Albizia falcataria* of 0.23 in specific gravity, single-layer particle boards of 80-90% in mat thickness compression ratio, 16 mm in thickness and 0.20, 0.4 and 0.55 in board density were made in the same manner as in Example 1. The resulting particle boards were not subjected to sand by a sander or the like.

Comparative Example 3

Using *Albizia falcataria* of 0.23 in specific gravity, single-layer particle boards of less than 80% or more than 90% in mat thickness compression ratio, 16 mm in thickness and 0.15, 0.19 and 0.6 in board density were made in the same manner as in Example 1. The resulting particle boards were not subjected to sand by a sander or the like.

Tests for evaluation of physical properties were conducted on the particle boards obtained in Example 4 and Comparative Example 3, and the results are shown in Table 4.

TABLE 4

| | Comparative Example 3 | | Example 4 | | | Comparative Example 3 |
|---|---|---|---|---|---|---|
| Board density | 0.15 | 0.19 | 0.20 | 0.4 | 0.55 | 0.6 |
| Mat thickness compression ratio (%) | 74.1 | 78.7 | 80.7 | 86.7 | 88.6 | 91.1 |
| Press time (sec) | 100 | 120 | 120 | 150 | 150 | 240 |
| Bending strength (N/mm$^2$) | 1.4 | 2.5 | 3.1 | 9.8 | 19.3 | 23.5 |

The number of test specimen: 3 boards x 2 specimens/one board, namely, 6 specimens in total for each board density.

When the particle board is used as a core material, on the surface of which a wooden thin plate such as a veneer is laminated, a bending strength of about 3.0 N/mm$^2$ or higher is necessary. It can be seen from the results in Table 4 that the particle boards of 80% or more in mat thickness compression ratio had a strength necessary for the use in which a wooden thin plate was laminated on the surface. When the mat thickness compression ratio exceeded 90%, the press required considerably long time to cause deterioration in productivity.

Example 5

Using *Albizia falcataria* of 0.23 in specific gravity, three-layer particle boards of 80-90% in mat thickness compression ratio, 16 mm in thickness and 0.20, 0.4 and 0.55 in board density were made in the same manner as in Example 2. The resulting particle boards were sanded by a sander to give a thickness of 15 mm.

Comparative Example 4

Using *Albizia falcataria* of 0.23 in specific gravity, three-layer particle boards of less than 80% or more than 90% in mat thickness compression ratio, 16 mm in thickness and 0.15, 0.19 and 0.6 in board density were made in the same manner as in Example 2. The resulting particle boards were sanded by a sander to give a thickness of 15 mm.

Tests for evaluation of physical properties were conducted on the particle boards obtained in Example 5 and Comparative Example 4, and the results are shown in Table 5.

TABLE 5

| | Comparative Example 4 | | Example 5 | | | Comparative Example 4 |
|---|---|---|---|---|---|---|
| Board density | 0.15 | 0.19 | 0.20 | 0.4 | 0.55 | 0.6 |
| Mat thickness compression ratio (%) | 73.3 | 77.1 | 80.0 | 85.5 | 89.3 | 92.0 |
| Press time (sec) | 100 | 120 | 120 | 150 | 150 | 240 |
| Bending strength (N/mm$^2$) | 1.1 | 2.1 | 3.0 | 9.0 | 19.7 | 23.5 |

The number of test specimen: 3 boards x 2 specimens/one board, namely, 6 specimens in total for each board density.

It can be seen from the results in Table 5 that the particle boards of 80% or more in mat thickness compression ratio had a strength necessary for the usage in which a wooden thin plate was laminated on the surface. When the mat thickness compression ratio exceeded 90%, press required considerably long time to cause deterioration in productivity.

Example 6

Using *Albizia falcataria* of 0.23 in specific gravity, a single-layer particle board of 16 mm in thickness and 0.4 in board density was made in the same manner as in Example 1. The resulting particle board was not subjected to sand by a sander or the like.

Comparative Example 5

Using *Gmelina arborea* of 0.44 in specific gravity, *Pinus merkusii* of 0.54 in specific gravity and *Acacia mangium* of 0.6 in specific gravity, single-layer particle boards of 16 mm in thickness and 0.4 in board density were made in the same manner as in Example 1. The resulting particle boards were not subjected to sand by a sander or the like.

Tests for evaluation of physical properties were conducted on the particle boards obtained in Example 6 and Comparative Example 5, and the results are shown in Table 6.

TABLE 6

| | Example 6 | Comparative Example 5 | | |
|---|---|---|---|---|
| Board density | 0.23 | 0.44 | 0.54 | 0.6 |
| Mat thickness compression ratio (%) | 86.7 | 79.8 | 77.1 | 73.3 |
| Press time (sec) | 150 | 150 | 150 | 150 |
| Bending strength (N/mm$^2$) | 9.8 | 5.9 | 3.7 | 3.4 |

The number of test specimen: 3 boards x 2 specimens/one board, namely, 6 specimens in total for each board density.

As can be seen from the results in Table 6, the particle board of Example 6 was superior in bending strength to all the particle boards of Comparative Example 5.

Example 7

Using *Albizia falcataria* of 0.23 in specific gravity, a three-layer particle board of 16 mm in thickness and 0.4 in board specific gravity was made in the same manner as in Example 2. The resulting particle board was sanded by a sander to give a thickness of 15 mm.

Comparative Example 6

Using *Gmelina arborea* of 0.44 in specific gravity, *Pinus merkusii* of 0.54 in specific gravity and *Acacia mangium* of 0.6 in specific gravity, three-layer particle boards of 16 mm in thickness and 0.4 in board density were made in the same manner as in Example 2. The resulting particle boards were sanded by a sander to give a thickness of 15 mm.

Tests for evaluation of physical properties were conducted on the particle boards obtained in Example 7 and Comparative Example 6, and the results are shown in Table 7.

TABLE 7

| | Example 7 | Comparative Example 6 | | |
|---|---|---|---|---|
| Board density | 0.23 | 0.44 | 0.54 | 0.6 |
| Mat thickness compression ratio (%) | 85.5 | 79.3 | 75.8 | 71.9 |
| Press time (sec) | 150 | 150 | 150 | 150 |
| Bending strength ($N/mm^2$) | 9.0 | 4.7 | 2.2 | 3.2 |

The number of test specimen: 3 boards × 2 specimens/one board, namely, 6 specimens in total for each board density.

As can be seen from the results in Table 7, the particle board of Example 7 was superior in bending strength to all the particle boards of Comparative Example 6.

INDUSTRIAL APPLICABILITY

As explained in detail above, particle boards light in weight and excellent in strength, dimensional stability and surface qualities can be made at a low cost by using particles obtained from a wooden material of low specific gravity and increasing the compression ratio in mat thickness before and after the press.

The invention claimed is:

1. A method for making a particle board which comprises forming a mat from particles obtained from a wooden raw material and pressing the mat to make a particle board, characterized in that the wooden raw material used has a low specific gravity and the press of the mat is carried out with a high compression ratio in mat thickness before and after the press, wherein the compression ratio in mat thickness before and after the press is not less than 80% and not more than 90% and wherein all of the wooden raw material used for making the particle board is *Paraserianthes falcataria* Becker.

2. A method for making a particle board according to claim 1, wherein the board density is not more than 0.55.

3. A method for making a particle board according to claim 1, wherein the particle board has a single-layer structure.

4. A method for making a particle board according to claim 1, wherein particles of smaller particle diameter are distributed for board surface and particles of larger particle diameter are distributed for core layer to make a three-layer structure.

5. A method for making a particle board according to claim 1, wherein a formaldehyde adhesive is used as an adhesive.

6. A method for making a particle board according to claim 5, wherein the formaldehyde adhesive is a urea formaldehyde resin adhesive.

7. A method for making a particle board according to claim 1, wherein a wooden thin plate is further laminated on the surface of the resulting particle board.

8. A particle board made by a method according to claim 1.

9. A particle board according to claim 8 which has a board density of not less than 0.2 and not more than 0.55 and a specific bending strength of not less than 15 and not more than 36.

10. A method for making a particle board according to claim 1, wherein the mat is formed from a material consisting of the particles and an adhesive.

11. A method for making a particle board according to claim 1, wherein the press rate is in the range between 7.5 sec/mm and 9.4 sec/mm.

* * * * *